US009892585B2

(12) United States Patent
Eschbach et al.

(10) Patent No.: US 9,892,585 B2
(45) Date of Patent: Feb. 13, 2018

(54) MAGNETIC WATERMARKING OF A PRINTED SUBSTRATE BY METAMERIC RENDERING

(75) Inventors: Reiner Eschbach, Webster, NY (US); Martin S. Maltz, Rochester, NY (US); Raja Bala, Webster, NY (US); Yonghui Zhao, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1182 days.

(21) Appl. No.: 12/546,848

(22) Filed: Aug. 25, 2009

(65) Prior Publication Data

US 2011/0052888 A1 Mar. 3, 2011

(51) Int. Cl.

| | |
|---|---|
| ***B32B 3/10*** | (2006.01) |
| ***G07D 7/04*** | (2016.01) |
| ***G07D 7/005*** | (2016.01) |

(52) U.S. Cl.

CPC ............... *G07D 7/04* (2013.01); *G07D 7/005* (2017.05); *Y10T 428/24835* (2015.01)

(58) Field of Classification Search

USPC .......................................... 428/195.1; 347/74

See application file for complete search history.

(56) References Cited

U.S. PATENT DOCUMENTS

| | | | | |
|---|---|---|---|---|
| 5,734,752 | A | 3/1998 | Knox | |
| 6,243,504 | B1 * | 6/2001 | Kruppa | 382/318 |
| 2003/0211299 | A1 * | 11/2003 | Rajan et al. | 428/195.1 |
| 2004/0170912 | A1 * | 9/2004 | Brennan | 430/108.6 |
| 2006/0230273 | A1 * | 10/2006 | Crichton | 713/176 |
| 2007/0017990 | A1 | 1/2007 | Katsurabayashi | |
| 2007/0217847 | A1 | 9/2007 | Naota | |
| 2007/0256136 | A1 * | 11/2007 | Simske et al. | 726/26 |
| 2007/0268341 | A1 * | 11/2007 | Morgan et al. | 347/74 |
| 2008/0080009 | A1 | 4/2008 | Masui et al. | |
| 2008/0299333 | A1 | 12/2008 | Bala et al. | |
| 2008/0302263 | A1 | 12/2008 | Eschbach et al. | |
| 2008/0304696 | A1 | 12/2008 | Eschbach et al. | |
| 2008/0305444 | A1 | 12/2008 | Eschbach et al. | |
| 2011/0052888 | A1 | 3/2011 | Eschbach et al. | |
| 2011/0307592 | A1 | 12/2011 | de la Huerga | |
| 2012/0093412 | A1 | 4/2012 | Dauw et al. | |
| 2012/0113443 | A1 | 5/2012 | Itoh et al. | |

FOREIGN PATENT DOCUMENTS

| | | |
|---|---|---|
| JP | 2006039478 A | 2/2006 |
| JP | 2009000832 A | 1/2009 |

* cited by examiner

*Primary Examiner* — Christopher Polley

(74) *Attorney, Agent, or Firm* — Fox Rothschild LLP

(57) ABSTRACT

A document may include a non-magnetic substrate, a first colorant mixture printed as a first image upon the substrate, the first colorant mixture including a magnetic ink, and a second colorant mixture printed as a second image upon the substrate in substantially close spatial proximity to the printed first colorant mixture. The second colorant mixture may consist essentially of one or more non-magnetic inks and exhibit properties of both low visual contrast and high magnetic contrast against the first colorant mixture, such that the resultant printed substrate does not reveal the first image to the human eye, but will reveal the first image to a magnetic image reader.

19 Claims, 4 Drawing Sheets

MAGNETIC WATERMARKING OF A PRINTED SUBSTRATE BY METAMERIC RENDERING

CROSS-REFERENCE TO RELATED APPLICATIONS

This application is related to: Eschbach et al., U.S. Patent Application Publication No. 2008/0302263, entitled "INFRARED ENCODING OF SECURITY ELEMENTS USING STANDARD XEROGRAPHIC MATERIALS," the disclosure of which is incorporated herein by reference in its entirety.

BACKGROUND

1. Technical Field

This application relates to the useful manipulation of magnetic components found in toners as commonly utilized in various printer and electrostatographic print environments. More specifically, the present disclosure relates to at least one realization of magnetic encoding of data elements or magnetic marks in combination with distraction patterns.

2. Description of Related Art

To detect counterfeiting, various document security systems are available. For example, watermarking is a common way to ensure security in digital documents. Many watermarking approaches exist with different trade-offs in cost, fragility, robustness, etc. One prior art approach is to use special ink rendering where the inks are invisible under standard illumination. These inks normally respond to light outside the visible range and thereby may be made visible. Examples of such extra-spectral techniques are UV (ultraviolet) and IR (infrared). This traditional approach is to render the encoded data with special inks that are not visible under normal light, but that have strong distinguishing characteristics under the special spectral illumination. Determination of the presence or absence of such encoding may be thereby subsequently performed using an appropriate light source and detector. One example of this approach is found in U.S. Patent Application No. 2007/0017990 to Katsurabayashi et al. However, these special inks and materials are often difficult to incorporate into standard electrophotographic or other non-impact printing systems like solid ink printers, either due to cost, availability or physical/chemical properties. This in turn discourages their use in variable data printing arrangements, such as for redeemable coupons or other personalized printed media for example.

Another approach taken is a document where copy control is provided by digital watermarking, as for example in U.S. Pat. No. 5,734,752 to Knox, where there is provided a method for generating data encoding in the form of a watermark in a digitally reproducible document which are substantially invisible including the steps of: (1) producing a first stochastic screen pattern suitable for reproducing a gray image on a document; (2) deriving at least one stochastic screen description that is related to said first pattern; (3) producing a document containing the first stochastic screen; (4) producing a second document containing one or more of the stochastic screens in combination, whereby upon placing the first and second document in superposition relationship to allow viewing of both documents together, correlation between the first stochastic pattern on each document occurs everywhere within the documents where the first screen is used, and correlation does not occur where the area where the derived stochastic screens occur and the image placed therein using the derived stochastic screens becomes visible.

With each of the above patents and citations, and those mentioned below, the disclosures therein are totally incorporated by reference herein in their entirety for their teachings.

SUMMARY

Before the present systems, devices and methods are described, it is to be understood that this disclosure is not limited to the particular systems, devices and methods described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the term "comprising" means "including, but not limited to."

In an embodiment, a document may include a non-magnetic substrate, a first colorant mixture printed as a first image upon the substrate, the first colorant mixture including a magnetic ink, and a second colorant mixture printed as a second image upon the substrate in substantially close spatial proximity to the printed first colorant mixture. The second colorant mixture may consist essentially of one or more non-magnetic inks and exhibit properties of both low visual contrast and high magnetic contrast against the first colorant mixture, such that the resultant printed substrate does not reveal the first image to the human eye, but will reveal the first image to a magnetic image reader.

In an embodiment, a method for creating a mark on a document may include printing at least one first colorant mixture as a first image upon a non-magnetic substrate, the first colorant mixture having a property of high magnetic contrast in relation to the substrate, and printing at least one second colorant mixture as a second image upon the substrate in substantially close spatial proximity to the printed first colorant mixture, the second colorant mixture having a property of low magnetic contrast in relation to the substrate and a property of low visual contrast in comparison to the first colorant mixture.

In an embodiment, a document may include a non-magnetic substrate, a first colorant mixture printed as a first image upon the substrate, the first colorant mixture having a property of high magnetic contrast in conjunction with the substrate, and a second colorant mixture printed as a second image upon the substrate in substantially close spatial proximity to the printed first colorant mixture, the second colorant mixture having a property of low magnetic contrast in conjunction with the substrate, and a property of low visual contrast against the first colorant mixture, such that the resultant printed substrate image will yield a discernable pattern evident as a magnetic mark when viewed with a magnetic image reader.

BRIEF DESCRIPTION OF THE DRAWINGS

Aspects, features, benefits and advantages of the present application will be apparent with regard to the following description and accompanying drawings, of which.

DETAILED DESCRIPTION

Figure 1:
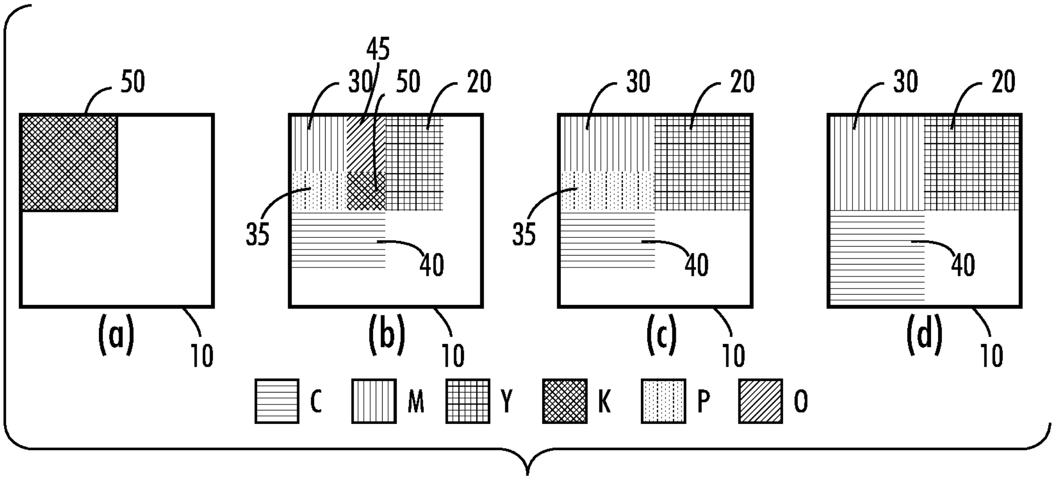
FIG. 1 schematically depicts metameric situations where different colorant combinations and distributions lead to identical visual impressions under normal illumination according to an embodiment.

The following terms shall have, for the purposes of this application, the meanings set forth below.

For the purposes of the discussion below, "data" refers to information in numeric form that can be digitally transmitted or processed.

An "image", as a pattern of physical light or a collection of data representing said physical light, may include characters, words, and text as well as other features such as graphics. A "digital image", by extension, is an image represented by a collection of digital data. An image may be divided into "segments," each of which is itself an image. A segment of an image may be of any size up to and including the whole image. The term "image object" or "object" as used herein is generally equivalent to the term "segment" and will be employed herein interchangeably. In the event that one term or the other is deemed to be narrower or broader than the other, the teaching as provided herein and claimed below is directed to the more broadly determined definitional term, unless that term is otherwise specifically limited within the claim itself.

In a digital image composed of data representing physical light, each element of data may be called a "pixel," which is common usage in the art and refers to a picture element. Each pixel has a location and value. Each pixel value may be one or more bits in a binary form, a gray scale value in a gray scale form, or a set of color space coordinates in a color coordinate form. The binary form, gray scale form, and color coordinate form may each form a two-dimensional array defining an image. An operation performs "image processing" when it operates on an item of data that relates to part of an image. "Contrast" is used to denote the visual difference between items, data points, and the like. It can be measured as a color difference or as a luminance difference or both.

A "digital color printing system" is an apparatus arrangement suited to accepting image data and rendering that image data upon a substrate.

A "colorant" is one of the fundamental subtractive C, M, Y, K primaries (cyan, magenta, yellow, and black) which may be realized in formulation as liquid ink, solid ink, dye, electrostatographic toner, or other printable material.

A "colorant mixture" is a particular combination of C, M, Y, K colorants.

"Toner" refers to the wet or dry material that forms an image or text on a substrate. The terms ink and toner are used interchangeably to refer to this material.

"Magnetic ink" may refer to ink that is used in magnetic ink character recognition ("MICR"), a character recognition technology where MICR characters are printed with magnetic ink or toner. Positive additives to the magnetic ink or toner may include iron oxide.

"Non-magnetic ink" may refer to an ink that does not exhibit a magnetic field or only exhibits a nominal magnetic field that is substantially and measurably different from that of magnetic ink.

"Metameric rendering" or "metameric printing" is the ability to use multiple colorant combinations to render a single visual color, as can be achieved when printing with more than three colorants. It is understood, in this context, that an ideal metameric match may only be achieved in non-realistic laboratory viewing conditions and that here, and in the subsequent paragraphs, the term is used to indicate a practical visual match given the viewing environment of the user.

There is a well established understanding in the printing industry regarding the utilization of magnetic inks in combination with magnetic detection devices as employed for security marks, particularly as a technique to deter counterfeiting or unauthorized copying and to facilitate check processing in banks. See for example: U.S. Pat. No. 3,000,000 to Eldredge. However, there remains a long standing need for a technique which will provide similar benefits but with lower complexity and cost, particularly in a digital printing environment, and using common consumables.

FIG. 1 depicts a conceptualization of metameric printing for a human observer. The visual response for a human observer is in most practical applications described sufficiently with a three component system, such as that defined by the International Commission on Illumination ("CIE"). In an idealized system with ideal toners, all four areas 10 in FIGS. 1(*a*), (*b*), (*c*), and (*d*) will result in the same visual response under normal illumination, which also may be referred to by those skilled in the art as having the same Lab values. Inside the predetermined area 10, different amounts of yellow 20, magenta 30, cyan 40 and black 50 colorant are deposited, as in a standard four color printing process. Also, dependent on the overlap provided with the different colorants, the mixtures blue 35 and red 45 are created from cyan 40 and magenta 30, or yellow 20 and magenta 30 respectively.

Figure 2:
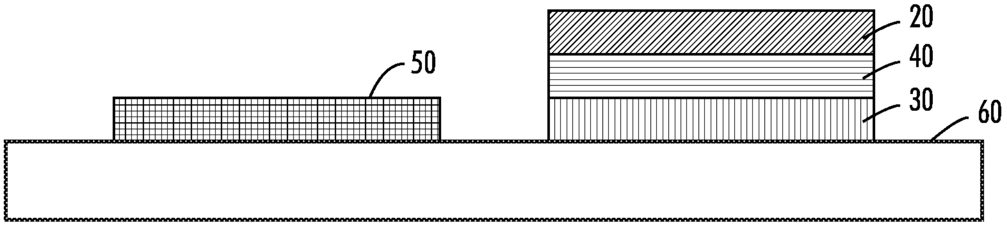
FIG. 2 schematically depicts in cross-sectional profile two instances where a single visual color black is achieved with different colorant combinations according to an embodiment.

FIG. 2 in cross-section conceptually shows different ways in which the visual color black can be achieved either by using a black colorant 50, or in the alternative by the superposition of yellow 20, magenta 30, and cyan 40, colorants as printed onto the substrate print surface 60. An important aspect depicted by FIG. 2 is that a single color, in this case black, can be achieved by a multitude of metameric colorant combinations, of which but two are shown in this example. In general, every system that maps N components to n components with $N>n$, will have a multitude of ways to accomplish this mapping. It is understood by those skilled in the art that singularities might exist in the mapping so that certain visual triplets can only be achieved with a single or a small number of colorant quadruplets. Again, as will be understood by those skilled in the art, utilization of more than the standard four colorants is comprehended and contemplated in the claims below, and only omitted for clarity of explanation as being redundant and unnecessary for those skilled in the art.

As is provided by example in FIG. 1, the same visual color can be achieved with different amounts and combinations of the respective available colorants. From FIGS. 1(*c*) and (*d*) it should be clear from noting the overlap of magenta 30 and cyan 40 in (c), that the same amount of colorants have been used and all that has been changed is the spatial distribution only. In examples provided in FIGS. 1(*a*) and (*b*) however, the black colorant 50 provided there could conceptually be replaced by a super imposition of the three colorants yellow 20, magenta 30 and cyan 40 as is indicated in FIG. 2 without changing the visual perception of the color.

Under standard illumination, a human observer would not be able during normal observation scenarios to distinguish the way a rendered color was produced from amongst the various achievable colorant combinations. This commonly understood effect is often employed to select, as the best colorant combination from amongst the plethora of achievable combinations, that combination which favors some secondary requirement, such as materials use, cost, stability, and the like. Indeed, as will be readily noted by those skilled in the art, under-color removal is often employed so as to maximize black, and minimize C, M and Y colorant usage, so as to thereby minimize the cost for rendering a given color page.

The techniques taught herein work by finding colorant mask patterns that have identical CIE Lab values and so are hard to distinguish from each other under normal light. In the disclosed embodiments, the colorant mask patterns may exhibit very dissimilar magnetic responses, and thus display a high magnetic contrast with respect to one another when read by a magnetic reading device. This dissimilarity in magnetic responses under magnetic sensing can be easily detected with an image-based magnetic sensor, which may in essence be a magnetic camera. One example embodiment employs this difference by toggling between the black visual color caused by using a black colorant that exhibits a first magnetic property, and the black visual color caused by a combination of the cyan, magenta and yellow colorants that exhibits a different magnetic property, alternating the placement of each between either the background or foreground areas in close spatial proximity and complementary counter-opposition.

Figure 3:
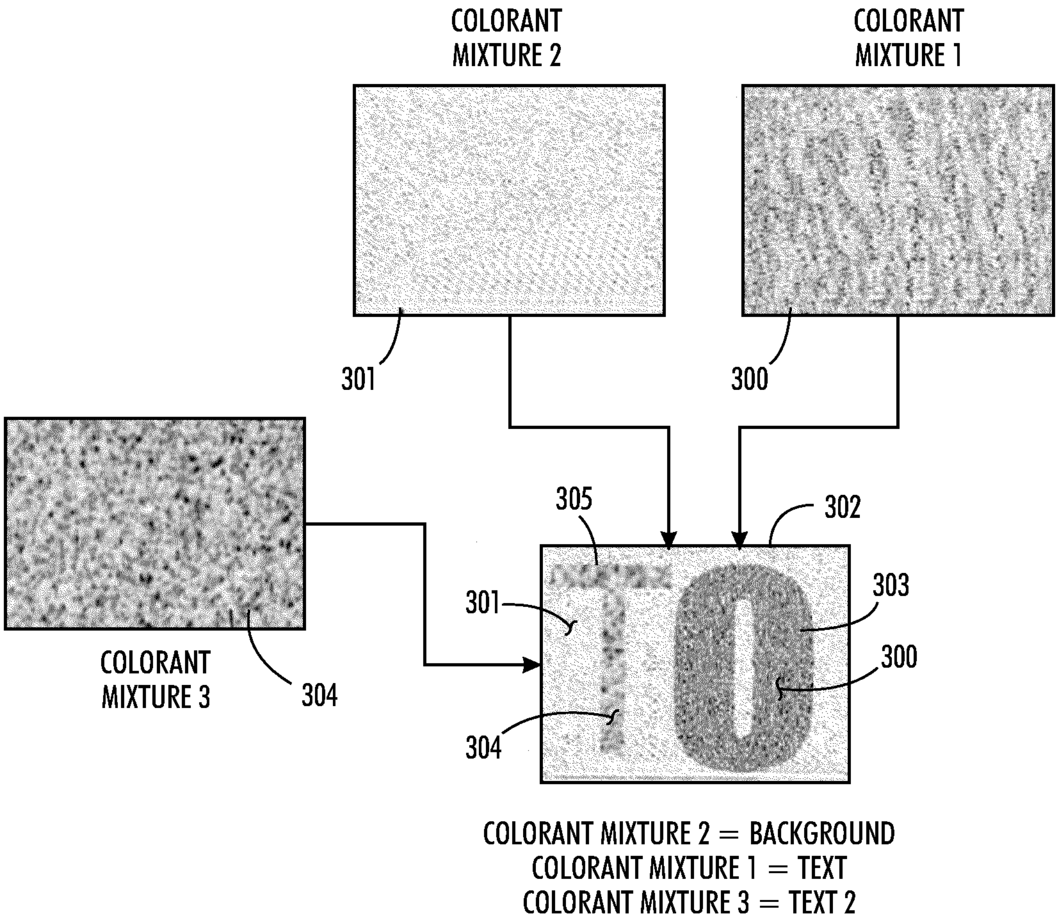
FIG. 3 depicts a method of using colorant or colorant mixtures to render an example alphanumeric character according to an embodiment.

FIG. 3 shows an exemplary application of the teachings enumerated above. In FIG. 3, a document may include a non-magnetic substrate, a first colorant mixture 300, and a second colorant mixture 301. The first colorant mixture 300 may be printed as a first image upon the substrate. The first colorant mixture 300 may include magnetic ink. Alternatively, the first colorant mixture 300 may have a property of high magnetic contrast in conjunction with the substrate. The second colorant mixture 301 may be printed as a second image upon the substrate in substantially close spatial proximity to the printed first colorant mixture 300. As used in this document, substantially close spatial proximity means that the two images have boundaries that abut each other, overlap, or are so close to each other that the boundary is not visually perceptible to a human under ordinary ambient viewing conditions. The second colorant mixture 301 may consist essentially of one or more non-magnetic inks and exhibit properties of both low visual contrast and high magnetic contrast against the first colorant mixture 300 such that the resultant printed substrate does not reveal the first image to the human eye but may reveal the first image to a magnetic image reader. Alternatively, the second colorant mixture 301 may have a property of low magnetic contrast in conjunction with the substrate, and a property of low visual contrast against the first colorant mixture 300, such that the resultant printed substrate image will yield a discernable pattern evident as a magnetic mark when viewed with a magnetic image reader. As used herein, low visual contrast means that a visual comparison of two printed items exhibits no perceptible color change. High magnetic contrast means that, when two materials printed on a substrate are compared, one exhibits a significantly greater magnetic response than the other.

In an embodiment, the first colorant mixture 300 may exhibit a visual color and the second colorant mixture 301 may exhibit the same visual color. The first colorant mixture 300 may include predominately black colorant. For example, the first colorant mixture may be a carbon black toner or ink. The second colorant mixture 301 may include yellow, cyan, and magenta. The first and second colorant mixtures 300 and 301 may exhibit substantially similar grayscale values. The first colorant mixture 300 and the second colorant mixture 301 may further be a close metameric color match under normal illumination but different in their response under magnetic sensing.

In an embodiment, the substrate may be paper. Alternatively, the substrate may be a transparency, packaging material, plastic, or other medium on which toner may be printed.

Each colorant mixture 300 or 301 may be either a single CMYK colorant or any mixture of CMYK colorants. They will, however, differ in that colorant mixture 301 will be selected so as to provide higher magnetic response than that selected for colorant mixture 300, or vice versa. However, in some embodiments, the colorant mixtures 300 and 301 will be selected most optimally to match each other closely in their average color under normal light, while at the same time differing in their average magnetic response. Thus, under normal illumination, area 302 would look to a human observer as a constant or quasi constant color or pattern, while under magnetic sensing tool area 302 would separate into two distinct areas represented by colorant mixtures 300 and 301 exhibiting a clear contrast to a magnetic sensitive device such as a magnetic camera or MICR reader device. Thus, the magnetic sensitive device would show an image 303 in which the magnetic ink is highlighted, and the image 303 formed by the magnetic ink is revealed.

In an embodiment, the document may further include a third colorant mixture 304 printed as a third image 305 upon the substrate. The third colorant mixture 304 may exhibit a visual color and/or magnetic field strength that differs from that of the first colorant mixture 300 and/or the second colorant mixture 301.

As a further example, an approximately 50% grayscale gray colorant mixture may be realized with a halftone of black colorant only. This may then be matched against a colorant mixture comprising a high amount of yellow mixed with enough cyan and magenta to yield a similar approximate 50% grayscale gray colorant mixture. However, with the given high content of black colorant amount the single colorant halftone case will provide much higher absorption of magnetic ink as compared to the colorant mixture. Thus and thereby, two colorant mixtures may be realized which while appearing quite nearly identical under normal viewing illumination, will never-the-less appear quite different to the appropriate device under magnetic sensing conditions.

Further, as will be understood by those skilled in the art, this may be approached as an intentional exploitation of metamerism to reproduce the same color response from two different colorant mixtures under normal viewing illumination. Mixtures which are optimized to vary sufficiently in their average magnetic response and are otherwise a close metameric match under normal room lighting.

A method for creating a mark on a document may include printing at least one first colorant mixture 300 as a first image 303 upon a non-magnetic substrate, and printing at least one second colorant mixture 301 as a second image upon the substrate in substantially close spatial proximity to the printed first colorant mixture 300. The first colorant mixture 300 may have a property of high magnetic contrast in relation to the substrate, and the second colorant mixture 301 may have a property of low magnetic contrast in relation to the substrate and a property of low visual contrast in comparison to the first colorant mixture 300. In an embodiment, the method may further include printing a third image on the substrate. The third image may include at least the first colorant mixture and the second colorant mixture arranged in close spatial proximity to each other. The spatial image arrangement of the at least two colorant mixtures may reveal a magnetic mark to a suitable magnetic image reader. Alternatively, the method may further include printing a third colorant mixture 304 as a third image 305 upon the substrate. The third colorant mixture 304 may exhibit a magnetic field strength that differs from than of the first colorant mixture 300. It is understood that printing of this third colorant mixture is preferably done as an overprint (addition) to the previously deposited colorant mixtures rather than as a replacement of the previously deposited colorant mixtures. For FIG. 3, this means that the colorant mixture 304 will result in two colorant mixtures 304/300 and 304/301 dependent on the previously deposited colorant mixture 300 or 301 at the location.

The above-described approach, while effective, may sometimes be discernable under normal illumination to those observers consciously aware and on the lookout for, or expecting a magnetic mark based on metameric rendering. This can for example be caused by an incorrect match due to printer imprecision/drift, and/or an incorrect match due to inherent calibration limitations, or based on differences in other colorant attributes, such as gloss. What is described herein below is a further technique which makes a magnetic mark that is increasingly difficult and even impossible for an unaided eye to discern absent the necessary magnetic sensing, as achieved by the incorporation of a distraction pattern.

Figure 4:
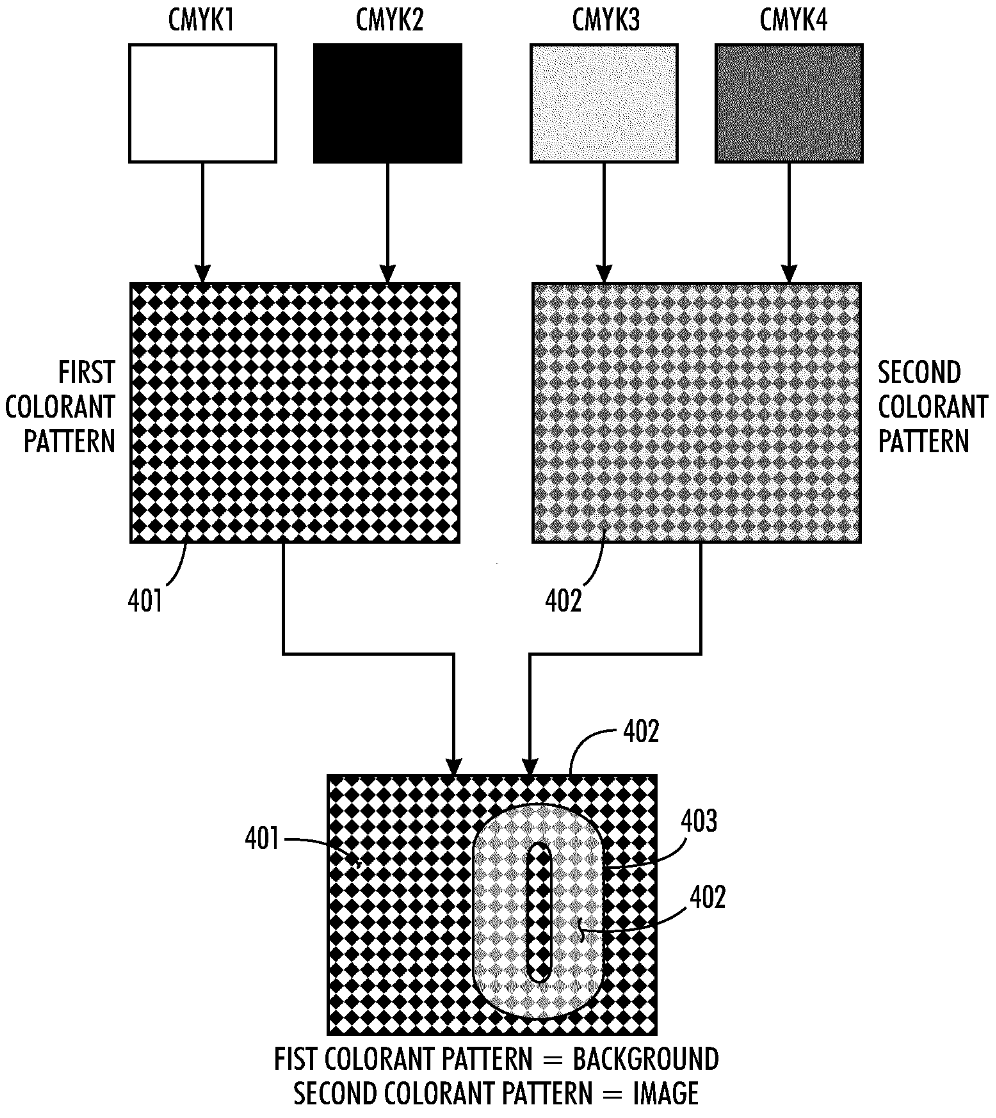
FIG. 4 depicts a method of creating an example alphanumeric character utilizing colorant mixture patterns including a colorant mixture distraction pattern.

In another embodiment, the two colorant mixtures may be printed onto the substrate in the form of a distraction pattern. FIG. 4 illustrates an example of such an embodiment. To make casual observation of a magnetic mark more difficult to discern by the lay observer, a spatial distraction pattern may be introduced with the differing colorant mixture selections described above. Each resultant color spatial pattern will on average have some given color appearance when viewed under normal light, and will exhibit, on average, some given level of magnetic response when viewed under magnetic sensing.

FIG. 4 depicts where one simple type of magnetic mark is simply a text string comprised of alphanumeric characters. The alphanumeric letter 403 selected in this FIG. 4 is an "O", and it can be represented as a two-state image—one state for the text image shape and the other state for the background. To construct this two-state image, two spatial color patterns 401 and 402 are provided, each corresponding to one of the two states. The two spatial colorant patterns are designed to have substantially similar average colors under normal light and yet substantially different magnetic responses. In an embodiment, the two spatial colorant patterns 401 and 402 are each provided as a repeating spatial pattern mosaic combination of one or more colors, each color in turn being itself either a single colorant or a CMYK colorant mixture.

In an exemplary embodiment provided in FIG. 4, there are contemplated four colorant mixtures, indicated as: CMYK1, CMYK2, CMYK3, and CMYK4. Fewer colorant mixtures may be used as will be discussed below, and as will be obvious to one skilled in the art more colorant mixtures may be employed as well. In this embodiment CMYK1 and CMYK2 are used to make up the first spatial colorant pattern 401. In turn CMYK3 and CMYK4 are used to make up the second spatial colorant pattern 402. The distraction pattern actually employed in this embodiment is a diamond checkerboard, but those skilled in the art will recognize the possibility of being able to select any number of other patterns, as for example a simple orthogonal checkerboard, or polka-dots. This pattern will act as a distraction to the eye and make it more difficult to discern the swapping between text/image and background. The actual distraction pattern granularity size is somewhat variable, flexible and empirical. The most optimum results are dependent upon the desired font or image size; the target print system to be employed for rendering; as well as the visual acuity of the target observer. Exemplary results will be realized when the spatial pattern used is the same or quite similar for both spatial colorant patterns 401 and 402.

Returning to the example provided in FIG. 4, the second spatial colorant pattern 402 is selected and applied to fill patch area 403, which is arranged in this example as an image depicting the alphanumeric symbol "O". Further, the first spatial colorant pattern 401 is selected and applied to patch area 402 arranged here in substantially close spatial proximity to patch area 403, and thereby effecting a background pattern around patch area 403. Both the spatial colorant patterns 401 and 402 are exemplarily arranged so that the pattern appears to be nearly continuous across patch 402 and patch 403. However, while the two spatial colorant patterns are designed to have substantially similar average colors under normal light and substantially different average magnetic response, they may have at least one CMYK colorant mixture in common. For example in FIG. 4, CMYK2 may be identical with CMYK4. This would mean that CMYK1 and CMYK3 would to have substantially similar average color levels under normal light and substantially different magnetic responses.

It is understood that the description above also holds for cases where the colorants are magnetic, since in such cases, a strong magnetic coding can be observed. However, for cases where the colorants are in themselves magnetic, the order of colorant deposition becomes important and care has to be taken that the order use does not alter the desired properties. In some embodiments, common magnetic black colorants may be applied in close spatial proximity with non-magnetic chromatic colorants.

Thus as discussed and provided above is a watermark embedded in an image that has the property of being nearly indecipherable by the unaided eye under normal light, and yet can easily be detected with a magnetic sensitive device. This magnetic mark comprises a magnetic readable substrate, and a first spatial colorant mixture pattern printed as an image upon the substrate. The first spatial colorant mixture pattern has the characteristic of low magnetic readability, as well as a property of low color contrast under normal illumination against a second spatial colorant mixture pattern. The second spatial colorant mixture pattern has a high magnetic readability, and printed in close spatial proximity to the first colorant mixture pattern, such that the resulting printed image suitably exposed to a magnetic read device, will yield a discernable pattern evident as a magnetic mark to the appropriate magnetic sensing device.

Figure 5:
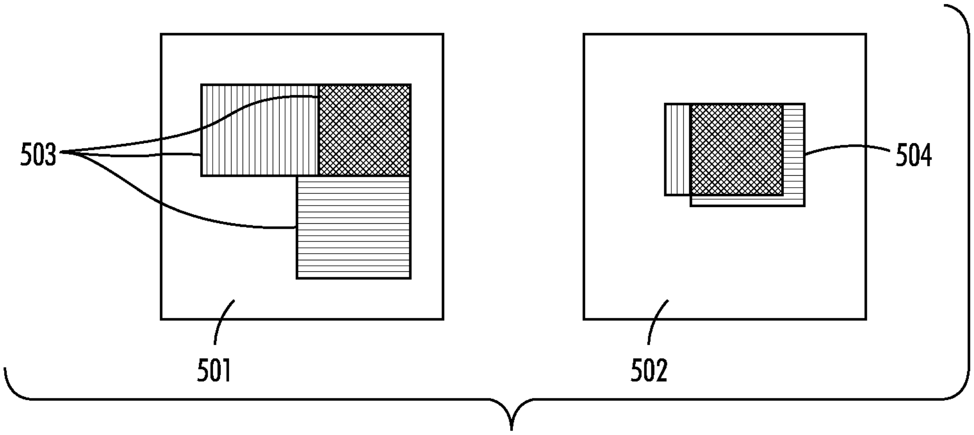
FIG. 5 depicts two colorant mixtures that yield identical Lab values, but which have different magnetic response properties according to an embodiment.

FIG. 5 depicts two colorant mixtures 501 and 502 yielding identical visual response, or identical Lab values, but maximally different magnetic response through utilizing non-magnetic ink in one mixture and MICR black toner in the other according to an embodiment. As shown in FIG. 5, the two colorant mixtures 501 and 502 may be two CMYK quadruplets yielding the identical visual response, or Lab values. However, these two CMYK quadruplets yield maximally different magnetic response, assuming non-magnetic CMY toners 503 and MICR black toner 504 are utilized.

In an embodiment, the two colorant mixtures 501 and 502 of FIG. 5 may follow the general design specifications of U.S. Application Publication No. 2008/0299333 entitled "Substrate Fluorescent Non-Overlapping Dot Patterns for Embedding Information in Printed Documents." Additional and/or alternate designs of color patches may also be used within the scope of this disclosure.

Figure 6:
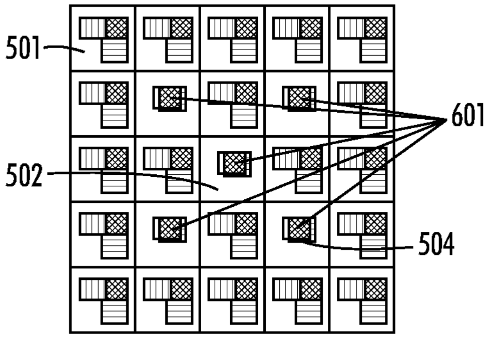
FIG. 6 depicts a magnetic coding of a magnetic mark in the form of an "X", where the magnetic mark is formed through the use of MICR black toner according to an embodiment.

FIG. 6 depicts a magnetic coding of a magnetic mark 601 in the form of an "X", where the magnetic mark 601 is formed through the use of MICR black toner 504 according to an embodiment. For example, the mark 601 in the form of an "X" may be encoded to be detectable by its magnetic response while not being visible in normal viewing conditions. In other embodiments, arbitrary magnetic coding that can be read by a magnetic detector may be performed. Additional and/or alternate magnetic coding may also be used within the scope of this disclosure.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the disclosed embodiments.

What is claimed is:

1. A document, comprising a non-magnetic substrate;

a first colorant mixture printed as a first repeating distraction pattern comprising a first colorant combination in mosaic combination with a second colorant combination upon the substrate, the first colorant mixture further comprising a magnetic ink; and a second colorant mixture printed as a second repeating distraction pattern comprising a third colorant combination in mosaic combination with a fourth colorant combination upon the substrate in substantially close spatial proximity to the printed first colorant mixture, wherein the second colorant mixture consists essentially of one or more non-magnetic inks and exhibits properties of both low visual contrast and high magnetic contrast against the first colorant mixture, such that the resultant printed substrate does not reveal the first repeating distraction pattern to the human eye, but will reveal the first repeating distraction pattern to a magnetic image reader.

2. The document of claim 1, wherein the first colorant mixture exhibits a visual color and the second colorant mixture exhibits the same visual color.

3. The document of claim 1, further comprising a third colorant mixture printed as a third repeating distraction pattern comprising a fifth colorant combination in mosaic combination with a sixth colorant combination upon the substrate, the third colorant mixture exhibiting a magnetic field strength that differs from that of the first colorant mixture.

4. The document of claim 1, where the substrate comprises paper.

5. The document of claim 1, where the substrate comprises a transparency.

6. The document of claim 2, wherein the first colorant combination is a grayscale value comprised of black colorant, and the third colorant combination is comprised of a yellow colorant, a cyan colorant, and a magenta colorant, such that the first colorant combination and the third colorant combination exhibit substantially similar grayscale values.

7. The document of claim 2, wherein the first colorant mixture and the second colorant mixture are a close metameric color match under illumination but differ in their response under magnetic sensing.

8. The document of claim 6, wherein the black colorant comprises a carbon black toner or ink.

9. The document of claim 1, wherein the first and the second repeating distraction patterns are selected from the group consisting of a diamond checkerboard pattern, an orthogonal checkerboard pattern, and a polka-dot pattern.

10. The document of claim 1, wherein the first repeating distraction pattern comprises a background, and the second repeating distraction pattern comprises an image.

11. The document of claim 1, wherein the first colorant combination and the third colorant combination exhibit substantially similar average colors under normal light, and substantially different magnetic response, and wherein the second colorant combination and the fourth colorant combination are identical.

12. The document of claim 1, wherein the first repeating distraction pattern and the second repeating distraction pattern are the same.

13. A document comprising:

a non-magnetic substrate;

a first colorant mixture printed as a first repeating distraction pattern comprising a first colorant combination in mosaic combination with a second colorant combination upon the substrate, the first colorant mixture having a property of high magnetic contrast in conjunction with the substrate; and a second colorant mixture printed as a second repeating distraction pattern comprising a third colorant combination in mosaic combination with a fourth colorant combination upon the substrate in substantially close spatial proximity to the printed first colorant mixture, the second colorant mixture having a property of low magnetic contrast in conjunction with the substrate, and a property of low visual contrast against the first colorant mixture, such that the resultant printed substrate image will yield a discernable pattern evident as a magnetic mark when viewed with a magnetic image reader.

14. The document of claim 13, wherein the substrate comprises paper.

15. The document of claim 13, wherein the substrate comprises a transparency.

16. The document of claim 13, wherein the first colorant combination is a grayscale value comprised of black colorant, and the third colorant combination is comprised of a yellow colorant, a cyan colorant, and a magenta colorant, such that the first colorant combination and the third colorant combination exhibit substantially similar grayscale values.

17. The document of claim 13, wherein the first colorant mixture and the second colorant mixture are a close metameric color match under normal illumination but differ in their response under magnetic sensing.

18. The document of claim 13, wherein the first and the second repeating distraction patterns are selected from the group consisting of a diamond checkerboard pattern, an orthogonal checkerboard pattern, and a polka-dot pattern.

19. The document of claim 13, wherein the first repeating distraction pattern comprises a background, and the second repeating distraction pattern comprises an image.

* * * * *